(12) United States Patent
Jun

(10) Patent No.: US 11,003,271 B2
(45) Date of Patent: May 11, 2021

(54) TOUCH SCREEN PANEL INCLUDING CONDUCTIVE LAYER FOR SHIELDING NOISE AND DISPLAY DEVICE HAVING THE SAME

(71) Applicant: SAMSUNG DISPLAY CO., LTD., Yongin-si (KR)

(72) Inventor: Sanghyun Jun, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/825,971

(22) Filed: Mar. 20, 2020

(65) Prior Publication Data

US 2020/0218395 A1 Jul. 9, 2020

Related U.S. Application Data

(63) Continuation of application No. 14/806,010, filed on Jul. 22, 2015, now Pat. No. 10,606,397.

(30) Foreign Application Priority Data

Oct. 10, 2014 (KR) .................. 10-2014-0136864

(51) Int. Cl.
 *G06F 3/041* (2006.01)
 *G06F 3/044* (2006.01)
(52) U.S. Cl.
 CPC .......... *G06F 3/0412* (2013.01); *G06F 3/0445* (2019.05); *G06F 3/0446* (2019.05); *G06F 3/04164* (2019.05)

(58) Field of Classification Search
 None
 See application file for complete search history.

(56) References Cited

U.S. PATENT DOCUMENTS

| 2012/0044662 A1* | 2/2012 | Kim .................. G06F 3/044 |
|---|---|---|
| | | 361/816 |
| 2013/0010216 A1 | 1/2013 | Kang et al. |
| | | (Continued) |

FOREIGN PATENT DOCUMENTS

| JP | 2010-277461 A | 12/2010 |
|---|---|---|
| JP | 2011-227793 A | 11/2011 |
| | (Continued) | |

*Primary Examiner* — Amare Mengistu
*Assistant Examiner* — Sarvesh J Nadkarni
(74) *Attorney, Agent, or Firm* — Lewis Roca Rothgerber Christie LLP

(57) ABSTRACT

A touch screen panel and display device having the same are disclosed. In one aspect, the touch screen panel includes a base layer, a noise shielding layer formed over a base layer, and a plurality of first touch sensors formed over the base layer. The touch screen panel further includes a plurality of second touch sensors formed over the base layer and electrically insulated from the first touch sensors. The second touch sensors cross the first touch sensors. The touch screen panel also includes a first pad part electrically insulated from and overlapping the noise shielding layer, wherein the first pad part comprises a plurality of signal pads. The touch screen panel further includes a plurality of touch signal lines respectively electrically connecting the signal pads to the first and second touch sensors.

10 Claims, 13 Drawing Sheets

(56) References Cited

U.S. PATENT DOCUMENTS

| 2013/0093706 A1* | 4/2013 | Kurasawa | G09G 3/3696 |
| | | | 345/173 |
| 2014/0071064 A1* | 3/2014 | Cho | G06F 3/044 |
| | | | 345/173 |
| 2014/0340597 A1 | 11/2014 | Sato | |

FOREIGN PATENT DOCUMENTS

| JP | 2013-097457 A | 5/2013 |
| KR | 10-2011-0020049 A | 3/2011 |
| KR | 10-2011-0044670 A | 4/2011 |
| KR | 10-1050460 B1 | 7/2011 |
| KR | 10-1373044 B1 | 3/2014 |
| KR | 10-1481674 B1 | 1/2015 |

\* cited by examiner

TOUCH SCREEN PANEL INCLUDING CONDUCTIVE LAYER FOR SHIELDING NOISE AND DISPLAY DEVICE HAVING THE SAME

CROSS-REFERENCE TO RELATED APPLICATIONS

This application is a continuation of U.S. patent application Ser. No. 14/806,010, filed Jul. 22, 2015, which claims priority to and the benefit of Korean Patent Application No. 10-2014-0136864, filed Oct. 10, 2014, the entire content of both of which is incorporated herein by reference.

BACKGROUND

Field

The present disclosure generally relates to a touch screen panel and a display device having the same.

Description of the Related Technology

Display devices are used in a variety of multimedia devices, such as television sets, mobile phones, tablet computers, navigation systems, game consoles, etc. Traditionally, peripheral devices, such as a keyboard or a mouse, have been used as the input devices for such displays.

Touch screen panels have been developed as an input for displays and are formed directly on the display. Touch screen panels can be classified into add-on, touch-on-cover glass, and touch-on-display types. Touch-on-display type touch screen panels can further be classified into in-cell and on-cell types.

SUMMARY OF CERTAIN INVENTIVE ASPECTS

One inventive aspect is a touch screen panel that can reduce the influence of driving noise to prevent reductions in touch sensitivity.

Another aspect is a display device having the touch screen panel.

Another aspect is a display device including a display panel and a touch screen panel. The display device further includes an electrostatic discharge line. The display panel displays an image and the touch screen panel is formed on the display panel.

The touch screen panel includes a noise shielding layer, a plurality of first touch sensors, a plurality of second touch sensors, a first pad part, and a first line part. The noise shielding layer and the first touch sensors are formed on a base layer. The first pad part is insulated from and overlaps the noise shielding layer and includes a plurality of signal pads. The first line part includes a plurality of touch signal lines to connect a corresponding signal pad of the signal pads and a corresponding touch sensor of the first and second touch sensors.

The touch screen panel further includes an insulating layer. The insulating layer is interposed between the first touch sensors and the second touch sensors and between the noise shielding layer and the first pad part.

The first pad part further includes a first auxiliary pad electrically connected to the noise shielding layer through a contact hole formed through the insulating layer. The first auxiliary pad is provided in a plural number and applied with a constant direct current voltage.

Each of the first touch sensors includes a plurality of first sensing parts arranged in a first direction and first connection parts each connecting two first sensing parts adjacent to each other among the first sensing parts. Each of the second touch sensors includes a plurality of second sensing parts arranged in a second direction crossing the first direction and second connection parts each connecting two second sensing parts adjacent to each other among the second sensing parts.

The display panel is an organic light-emitting diode (OLED) display panel configured to include a base substrate, a wire layer, a device layer, and a sealing layer. The wire layer is formed on the base substrate. The wire layer includes a plurality of driving lines electrically connected to the device layer, a second line part including a plurality of display signal lines connected to the driving lines, and a second pad part including a plurality of pads connected to the display signal lines. The device layer is formed on the wire layer and the sealing layer covers the device layer and provides the base layer. The touch screen panel further includes a base substrate and the base substrate provides the base layer.

The noise shielding layer of the touch screen panel overlaps the second line part of the display panel or a second pad part.

The touch screen panel further includes the electrostatic discharge line applied with a constant direct current voltage. The base layer includes a sensing area in which the first and second touch sensors are formed and a non-sensing area, in which the electrostatic discharge line is formed, surrounding the sensing area, and the sensing area and the non-sensing area are defined on an upper surface of the base layer.

In the touch screen panel, the first auxiliary pad is provided in a plural number. One end of the electrostatic discharge line is connected to one first auxiliary pad of the first auxiliary pads, and the other end of the electrostatic discharge line is connected to the other first auxiliary pad of the first auxiliary pads.

The first pad part further includes a plurality of second auxiliary pads to apply the direct current voltage to the electrostatic discharge line. One end of the electrostatic discharge line is connected to one second auxiliary pad of the second auxiliary pads, and the other end of the electrostatic discharge line is connected to the other second auxiliary pad of the second auxiliary pads.

Another aspect is a touch screen panel comprising a base layer; a noise shielding layer formed over the base layer; a plurality of first touch sensors formed over the base layer; a plurality of second touch sensors formed over the base layer and electrically insulated from the first touch sensors, wherein the second touch sensors cross the first touch sensors; a first pad area electrically insulated from and overlapping the noise shielding layer, wherein the first pad area comprises a plurality of signal pads; and a plurality of touch signal lines respectively electrically connecting the signal pads to the first and second touch sensors.

In exemplary embodiments, the touch screen panel further comprises an insulating layer interposed: i) between the first touch sensors and the second touch sensors and ii) between the noise shielding layer and the first pad part. The first pad area can further comprise at least one first auxiliary pad electrically connected to the noise shielding layer via a contact hole formed in the insulating layer. The first auxiliary pad can be configured to receive a constant direct current (DC) voltage. Each of the first touch sensors can comprise: i) a plurality of first electrodes arranged in a first direction and ii) a plurality of first connectors each connecting two of the first electrodes, each of the second touch sensors can comprise i) a plurality of second electrodes arranged in a second direction crossing the first direction and ii) a plurality of second connectors each connecting two of the second electrodes, and the first and second electrodes can have a mesh structure.

In exemplary embodiments, the touch screen panel is formed on an organic light-emitting diode (OLED) display panel, wherein the OLED display panel comprises a sealing layer, and wherein the base layer is the sealing layer of the OLED display. The base layer can be a base substrate. The touch screen panel can further comprise an electrostatic discharge line configured to receive a constant direct current (DC) voltage, wherein the base layer comprises a sensing area in which the first and second touch sensors are arranged and a non-sensing area in which the electrostatic discharge line is formed, wherein the non-sensing area surrounds the sensing area. The at least one first auxiliary pad can comprise a plurality of first auxiliary pads, one end of the electrostatic discharge line can be electrically connected to one of the first auxiliary pads, and the other end of the electrostatic discharge line can be electrically connected to another of the first auxiliary pads.

In exemplary embodiments, the first pad area further comprises a plurality of second auxiliary pads configured to apply the DC voltage to the electrostatic discharge line, wherein one end of the electrostatic discharge line is electrically connected to one of the second auxiliary pads, and wherein the other end of the electrostatic discharge line is electrically connected to another of the second auxiliary pads.

Another aspect is a display device comprising a display panel configured to display an image; and a touch screen panel formed over the display panel, wherein the touch screen panel comprises: a noise shielding layer formed over the display panel; a plurality of first touch sensors formed over the display panel; a plurality of second touch sensors formed over the display panel and electrically insulated from the first touch sensors, wherein the second touch sensors cross the first touch sensors; a first pad area electrically insulated from and overlapping the noise shielding layer, wherein the first pad area comprises a plurality of signal pads; and a plurality of touch signal lines respectively electrically connecting the signal pads to the first and second touch sensors.

In exemplary embodiments, the touch screen panel further comprises an insulating layer interposed: i) between the first touch sensors and the second touch sensors and ii) between the noise shielding layer and the signal pads. The first pad area can further comprise at least one first auxiliary pad electrically connected to the noise shielding layer via a contact hole formed in the insulating layer. The first auxiliary pad can be configured to receive a constant direct current (DC) voltage.

In exemplary embodiments, each of the first touch sensors comprises: i) a plurality of first electrodes arranged in a first direction and a plurality of first connectors each connecting two of the first electrodes, wherein each of the second touch sensors comprises: i) a plurality of second electrodes arranged in a second direction crossing the first direction and ii) a plurality of second connectors each connecting two of the second electrodes, and electrically the first and second electrodes have a mesh structure.

In exemplary embodiments, the display panel comprises a base substrate; a wire layer formed over the base substrate; a device layer formed over the wire layer; and a sealing layer covering the device layer, wherein the noise shielding layer and the first touch sensors are directly formed on the sealing layer.

In exemplary embodiments, the wire layer comprises a plurality of driving lines electrically connected to the device layer; a plurality of display signal lines electrically connected to the driving lines; and a second pad area comprising a plurality of pads connected to the display signal lines, wherein the noise shielding layer overlaps the display signal lines.

In exemplary embodiments, the display device further comprises an electrostatic discharge line configured to receive a constant direct current (DC) voltage, wherein the display panel comprises a sensing area in which the first and second touch sensors are arranged and a non-sensing area in which the electrostatic discharge line is formed, wherein the non-sensing area surrounds the sensing area.

In exemplary embodiments, the at least one first auxiliary pad comprise a plurality of first auxiliary pads, wherein one end of the electrostatic discharge line is electrically connected to one of the first auxiliary pads, and wherein the other end of the electrostatic discharge line is electrically connected to another of the first auxiliary pads.

In exemplary embodiments, the first pad area further comprises a plurality of second auxiliary pads configured to apply the DC voltage to the electrostatic discharge line, wherein one end of the electrostatic discharge line is electrically connected to one of the second auxiliary pads, and wherein the other end of the electrostatic discharge line is electrically connected to another of the second auxiliary pads.

According to at least one embodiment, the noise shielding layer included in the touch screen panel prevents the noise, which is generated from the second line part or the pad part of the display panel, from exerting influence on the first pad part of the touch screen panel. Thus, the touch sensitivity of the touch screen panel may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION OF CERTAIN INVENTIVE EMBODIMENTS

Figure 1:
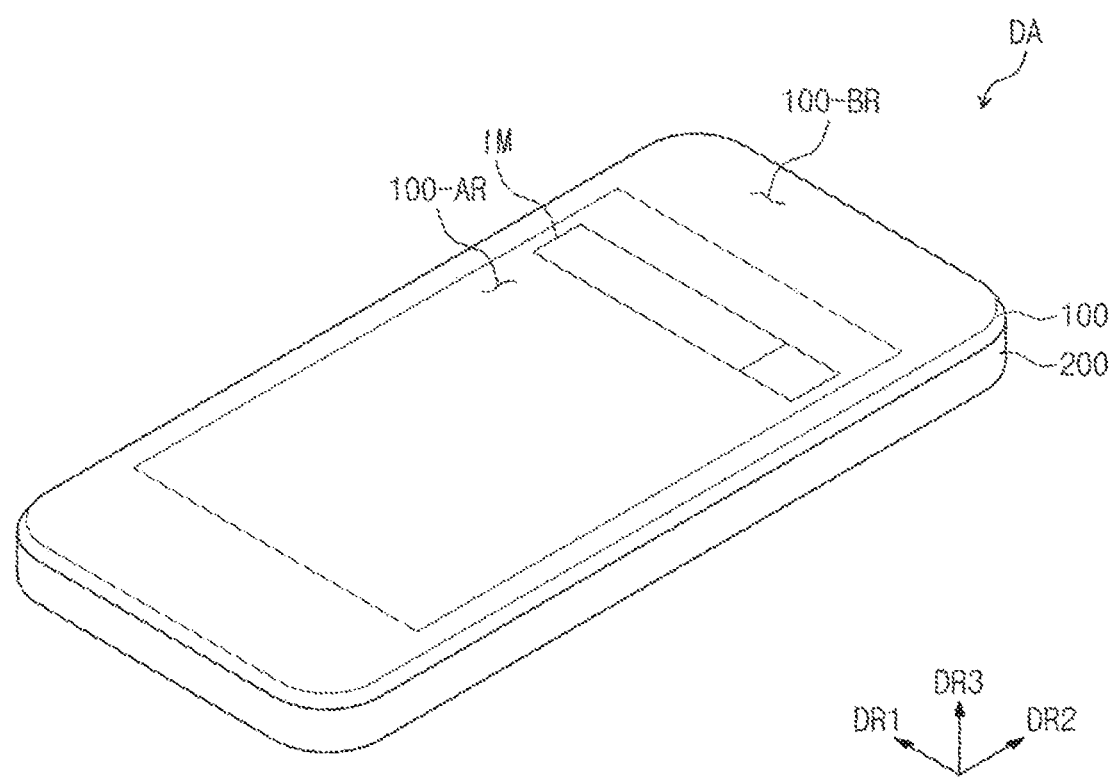
FIG. 1 is a perspective view showing a display device according to an exemplary embodiment.

It will be understood that when an element or layer is referred to as being "on", "connected to" or "coupled to" another element or layer, it can be directly on, connected or coupled to the other element or layer or intervening elements or layers may also be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

Figure 2:
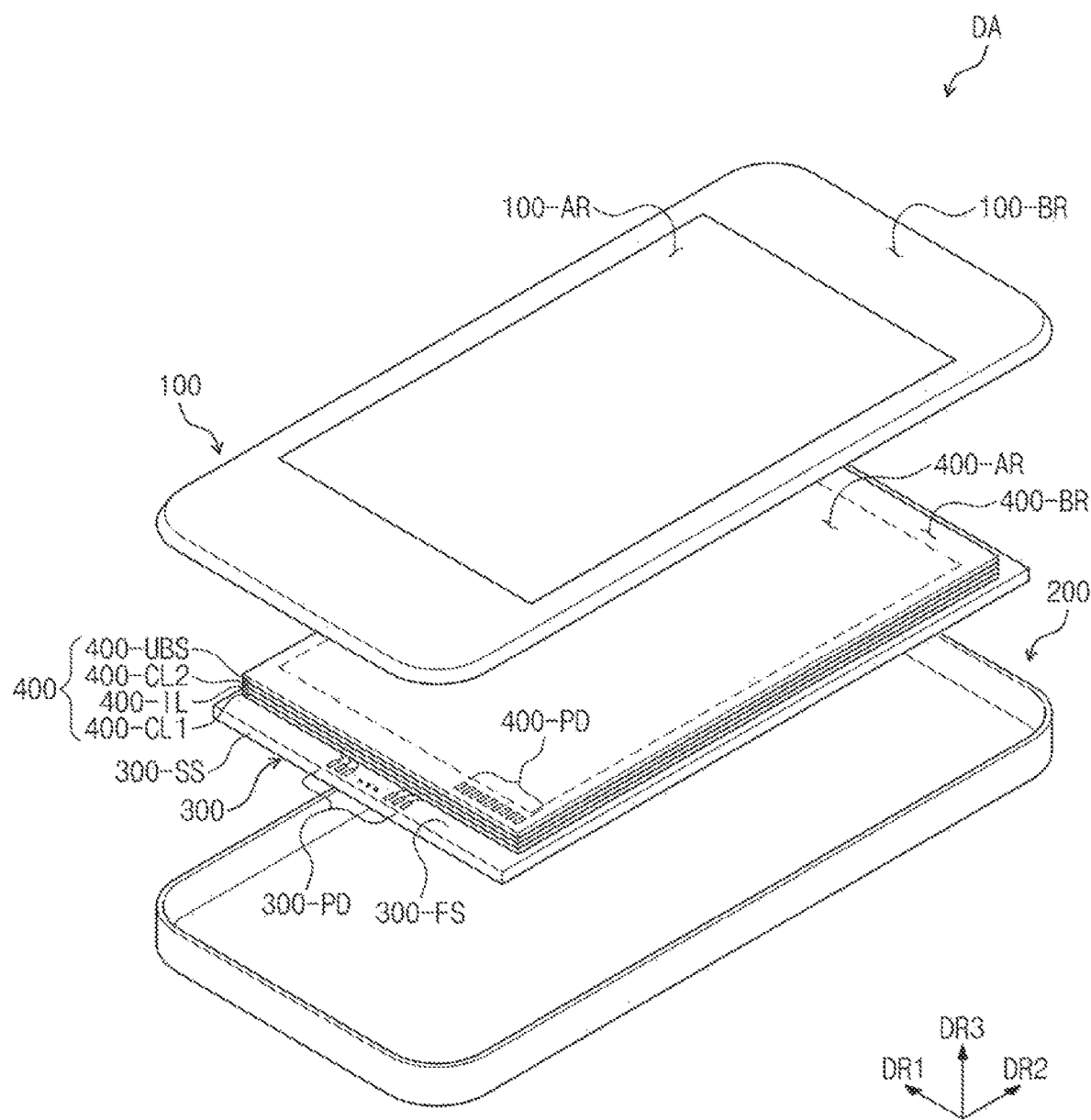
FIG. 2 is an exploded perspective view showing a display device according to an exemplary embodiment.

FIG. 1 is a perspective view showing a display device DA according to an exemplary embodiment. FIG. 2 is an exploded perspective view showing a display device DA according to an exemplary embodiment.

A display surface in which an image IM is displayed is substantially parallel to a surface defined by a first direction DR1 and a second direction DR2 and a line normal to the display surface is substantially parallel to a third direction DR3. The third direction DR3 is substantially normal to front and rear surfaces of each member of the display device DA. However, the first, second, and third directions DR1, DR2, and DR3 should not be limited thereto or thereby.

FIG. 1 shows a mobile phone as the display device DA according to an exemplary embodiment. However, the display device DA should not be limited to the mobile phone embodiment. For instance, the display device DA can be applied to a large-sized electronic device, such as a television set, an outdoor billboard, etc., and/or a small or medium-sized electronic device, such as a personal computer, a notebook computer, a personal digital assistant, a navigation unit, a game unit, a mobile electronic device, a wrist-type electronic device, a camera, etc., but the described technology should not be limited thereto or thereby.

Referring to FIG. 1, the display device DA includes a plurality of areas distinct from each other when viewed in a plan view. The display device DA includes a display area 100-AR in which the image IM is displayed and a non-display area 100-BR arranged adjacent to the display area 100-AR. As a representative example, FIG. 1 shows an internet search bar as the image IM. In the FIG. 1 embodiment, the display area 100-AR has a substantially quadrangular shape and the non-display area 100-BR surrounds the display area 100-AR. That is, the non-display area 100-BR corresponds to an edge of the non-display area 100-BR.

Referring to FIGS. 1 and 2, the display device DA includes a window member or window 100, a lower frame 200, a display panel 300, and a touch screen panel 400. Each of the window member 100, the display panel 300, and the touch screen panel 400 includes areas respectively corresponding to the display area 100-AR and the non-display area 100-BR of the display device DA.

The window member 100 includes a display area 100-AR configured to transmit the image IM displayed in the display panel 300 and a non-display area 100-BR arranged adjacent to the display area 100-AR. The window member 100 may be formed of glass, sapphire, or plastic.

The lower frame 200 is connected to the window member 100 to accommodate the display panel 300 and the touch screen panel 400. The lower frame 200 is manufactured by assembling a plurality of parts or is integrally formed in a single unitary and individual unit by, for example, an injection molding method. The lower frame 200 may include a plastic or metal material. In the present exemplary embodiment, the lower frame 200 can be omitted from the display device DA.

The display panel 300 includes a front surface 300-FS, a side surface 300-SS, and a rear surface (not shown). The front surface 300-FS of the display panel 300 includes a display area (not shown) and a non-display area (not shown). The display area 100-AR of the display panel 300 displays the image IM. The display panel 300 includes a base substrate, a wire layer, a device layer, and a sealing layer.

The touch screen panel 400 includes a first conductive layer 400-CL1, a second conductive layer 400-CL2, an insulating layer 400-IL, and an upper base member 400-UBS. The touch screen panel 400 includes a sensing area 400-AR overlapping the display area 100-AR of the window member 100 and a non-sensing area 400-BR overlapping the non-display area 100-BR of the window member 100.

A pad part or pad area 400-PD (hereinafter, referred to as a first pad part) of the touch screen panel 400, to which driving signals are applied, is arranged at one side of the non-sensing area 400-BR. In the FIG. 1 embodiment, the first pad part 400-PD is does not overlap a pad part or pad area 300-PD (hereinafter, referred to as a second pad part) of the display panel 300.

Hereinafter, configuration of the window member 100, the lower frame 200, the display panel 300, and the touch screen panel 400 will be described with reference to FIG. 2.

Referring to FIG. 2, the touch screen panel 400 and the window member 100 are arranged on the front surface 300-FS of the display panel 300. A black matrix (not shown) may be arranged on a rear surface of the window member 100 to define the non-display area 100-BR of the window member 100. The black matrix (not shown) is formed by coating a colored organic layer on the window member 100.

An optically clear adhesive film (OCA) can be arranged between the touch screen panel 400 and the window member 100. The touch screen panel 400 is attached to the window member 100 by the OCA. The touch screen panel 400 is arranged on the front surface 300-FS of the display panel 300.

The lower frame 200 is connected to the window member 100. The lower frame 200 covers the rear surface of the display panel 300. An adhesive member (not shown) is interposed between the rear surface of the display panel 300 and the lower frame 200. The lower frame 200 is attached to the rear surface of the display panel 300 by the adhesive member (not shown).

Figure 3:
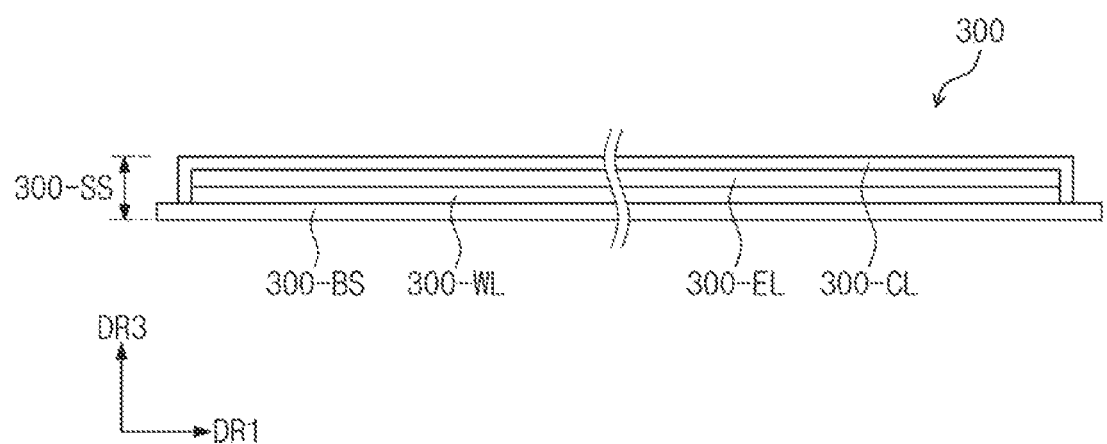
FIG. 3 is a cross-sectional view showing a display panel according to an exemplary embodiment.
Figure 4:
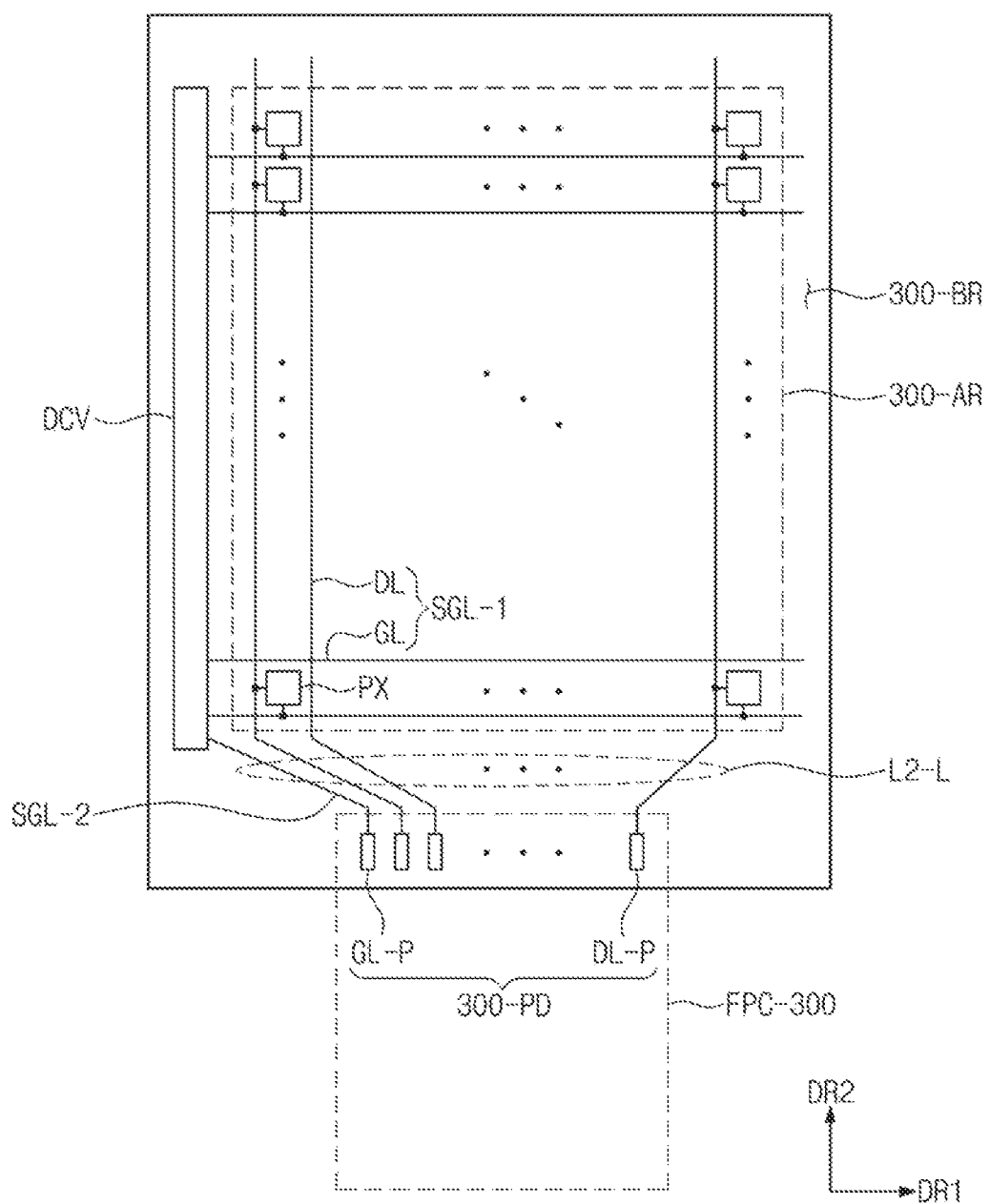
FIG. 4 is a plan view showing a display panel according to an exemplary embodiment.

FIG. 3 is a cross-sectional view showing a display panel according to an exemplary embodiment. FIG. 4 is a plan view showing a display panel according to an exemplary embodiment.

Referring to FIG. 3, the display panel 300 includes the base substrate 300-BS, the wire layer 300-WL, the device layer 300-EL, and the sealing layer 300-CL. The wire layer 300-WL is formed on the base substrate 300-BS and the device layer 300-EL is formed on the wire layer 300-WL. The sealing layer 300-CL covers the device layer 300-EL. The base substrate 300-BS includes at least one of polyimide (PI), polyethylene terephthalate (PET), polyethylene naphthalate (PEN), polyether sulfone (PES), and fiber reinforced plastic (FRP). The display panel 300 may further include a protective film (not shown) formed on a rear surface of the base substrate 300-BS. In addition, the display panel 300 may further include a polarizing plate (not shown) formed on the sealing layer 300-CL.

Referring to FIG. 4, the device layer 300-EL (refer to FIG. 3) of the display panel 300 includes a plurality of pixels PX. The pixels PX overlap the display area 300-AR. The wire layer 300-WL (refer to FIG. 3) of the display panel 300 includes a plurality of driving lines SGL-1, a plurality of signal lines SGL-2, gate pads GL-P connected to the signal lines SGL-2, and data pads DL-P.

The driving lines SGL-1 are electrically connected to the device layer 300-EL. The driving lines SGL-1 include gate lines GL arranged in the second direction DR2 and data lines DL arranged in the first direction DR1. Each pixel PX is connected to a corresponding gate line of the gate lines GL and a corresponding data line of the data lines DL. In some embodiments, each pixel PX includes an organic light-emitting diode (OLED) and a circuit configured to control the intensity of current applied to the OLED. Each circuit includes at least one thin film transistor and at least one capacitor. The configuration of the pixels can be varied depending on the light-emission technology of the display panel, e.g., the display panel can be one of a liquid crystal display panel, an OLED display panel, an electrophoretic display panel, etc.

The data lines DL are respectively connected to the signal lines SGL-2. At least one of the signal lines SGL-2 is connected to a driving circuit DCV. The signal lines SGL-2 are connected to the gate pads GL-P and the data pads DL-P.

The driving circuit DCV connected to the gate lines GL is arranged at one side of the non-display area 300-BR. The driving circuit DVC applies gate signals to the gate lines GL. The driving circuit DVC receives various signals, e.g., a clock signal, a control signal, etc., from the gate pads GL-P arranged in the non-display area 300-BR.

The non-display area 300-BR includes the second pad part 300-PD in which the gate pads GL-P and the data pads DL-P are formed and a peripheral area formed adjacent to the second pad part 300-PD. The second pad part 300-PD is connected to a first flexible printed circuit board FPC-300. The display panel 300 is connected to a main driving circuit through the first flexible printed circuit board FPC-300. The first flexible printed circuit board FPC-300 is bent along an imaginary line (not shown) substantially parallel to the first direction DR1 and the main driving circuit is arranged on the rear surface of the lower frame 200 (refer to FIGS. 1 and 2) or the rear surface of the display panel 300.

Figure 5:
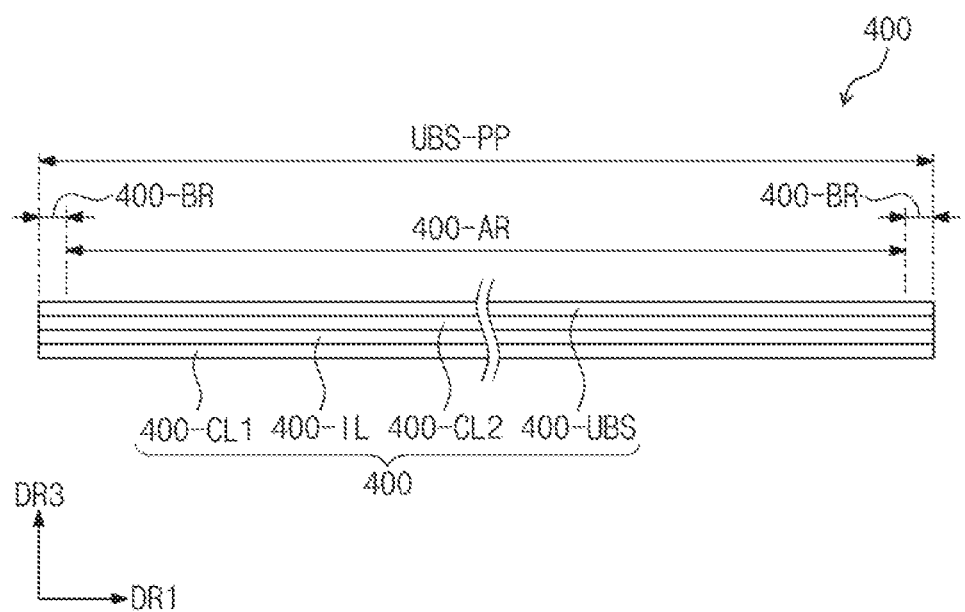
FIG. 5 is a cross-sectional view showing a touch screen panel according to an exemplary embodiment.
Figure 6A:
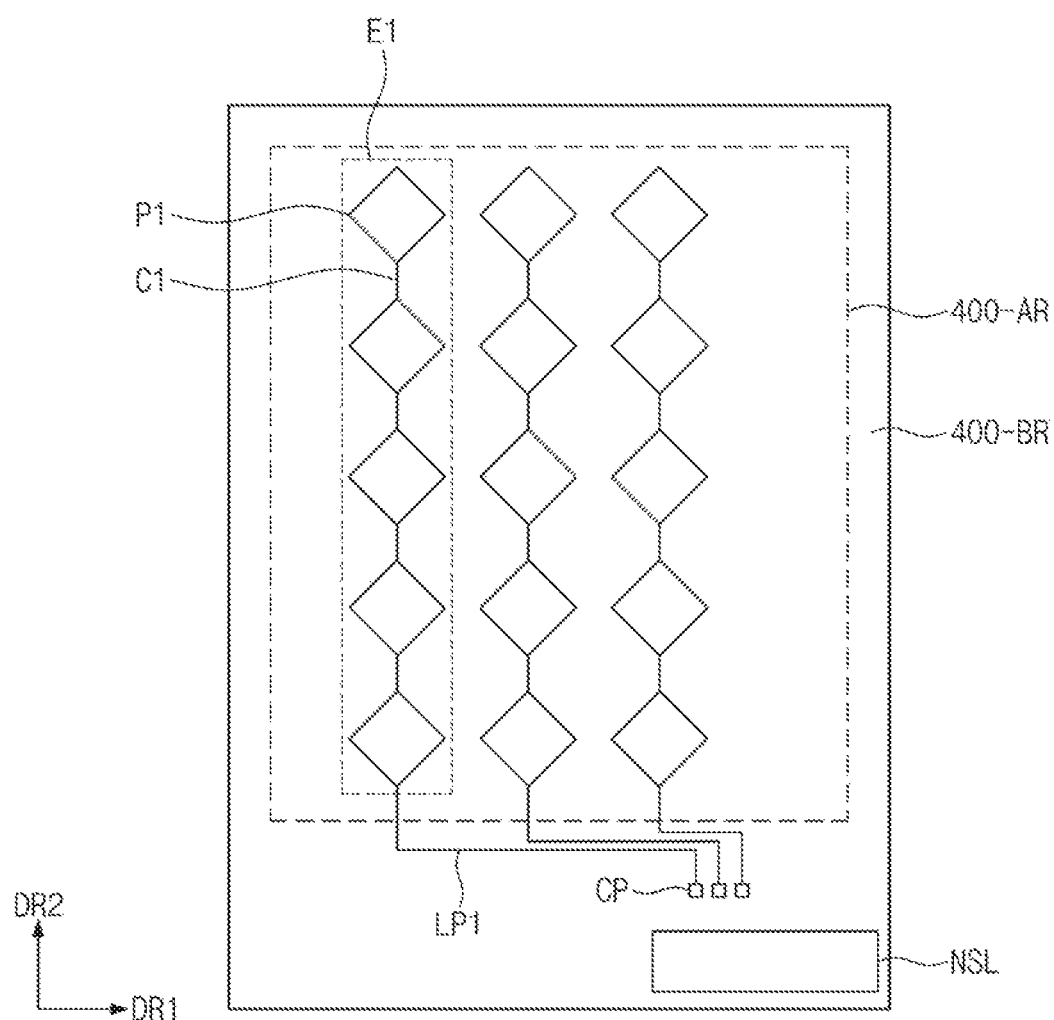
FIGS. 6A and 6B are views showing a touch screen panel according to an exemplary embodiment.
Figure 6B:
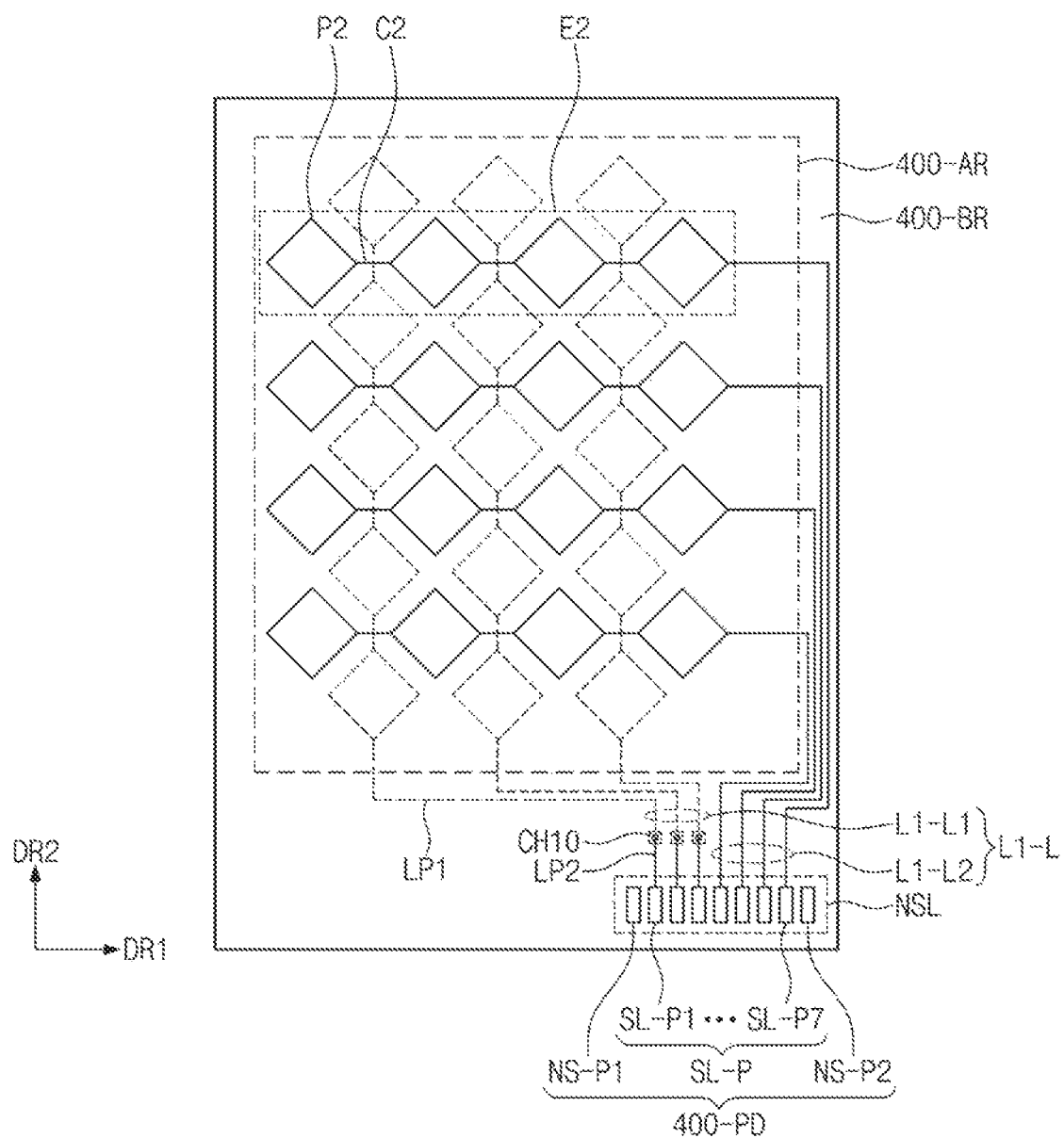

FIG. 5 is a cross-sectional view showing a touch panel according to an exemplary embodiment. FIGS. 6A and 6B are views showing a touch panel according to an exemplary embodiment. Hereinafter, the touch screen panel 400 will be described in detail with reference to FIGS. 5, 6A, and 6B.

Referring to FIG. 5, the touch screen panel 400 includes various layers. The touch screen panel 400 includes the first conductive layer 400-CL1, the insulating layer 400-IL, the second conductive layer 400-CL2, and the upper base member 400-UBS.

The first conductive layer 400-CL1 is formed on a base layer. The first conductive layer 400-CL1 includes a plurality of electrodes. In the present exemplary embodiment, the base layer is the sealing layer 300-CL shown in FIG. 3.

The insulating layer 400-IL is formed on the first conductive layer 400-CL1. The insulating layer 400-IL protects the first conductive layer 400-CL1 from external pressure and moisture. The insulating layer 400-IL insulates the first conductive layer 400-CL1 from the second conductive layer 400-CL2.

The second conductive layer 400-CL2 is formed on the insulating layer.

The upper base member 400-UBS is formed on the second conductive layer 400-CL2.

Although not shown in FIG. 5, the touch screen panel 400 can further include a base substrate. The base substrate serves as the base layer. The electrodes are formed on the base substrate.

FIG. 6A shows the first conductive layer 400-CL1 shown in FIG. 5.

Referring to FIG. 6A, the first conductive layer 400-CL1 formed on the base layer includes first touch sensors E1, a first signal line part or first signal line LP1 of a first sensor line part L1-L1 connected to the first touch sensors E1, a signal line contact part or signal line contact CP of the first sensor line part L1-L1, and a noise shielding layer NSL. The first touch sensors E1 overlap the sensing area 400-AR. The first signal line part LP1 overlaps the non-sensing area 400-BR.

The first touch sensors E1 include first sensing parts or first electrodes P1 and first connection parts or first connectors C1. The first touch sensors E1 extend in the second direction DR2 and are arranged in the first direction DR1. The first sensing parts P1 are connected to each other by the first connection parts C1. Each first connection part C1 connects two first sensing parts P1 adjacent to each other among the first sensing parts P1.

Each of the first touch sensors E1 is connected to the first signal line part LP1. The first signal line part LP1 connects the first touch sensors E1 to the signal line contact part CP of the first sensor line part L1-L1.

The noise shielding layer NSL is arranged to be spaced apart from the signal line contact part CP.

FIG. 6B shows the second conductive layer 400-CL2 shown in FIG. 2.

Referring to FIG. 6B, the second conductive layer 400-CL2 formed on the insulating layer 400-IL includes second touch sensors E2, a second signal line part or second signal line LP2 of the first sensor line part L1-L1, the first pad part 400-PD, and a second sensor line part or second sensor line L1-L2 connected to the second touch sensors E2. The second touch sensors E2 overlap the sensing area 400-AR and the second sensor line part L1-L2 overlaps the non-sensing area 400-BR.

The second touch sensors E2 include second sensing parts or second electrodes P2 and second connection parts or second connectors C2. The second touch sensors E2 extend in the first direction DR1 and are arranged in the second direction DR2. The second touch sensors E2 are electrically insulated from the first touch sensors E1 while crossing the first touch sensors E1. The second sensing parts P2 are connected to each other by the second connection parts C2. Each second connection part C2 connects two second sensing parts P2 adjacent to each other among the second sensing parts P2.

The second touch sensors E2 are connected to the second sensor line part L1-L2. The second sensor line part L1-L2 is connected to corresponding touch sensors of the second touch sensors E2. The second sensor line part L1-L2 connects the second touch sensors E2 and signal pads SL-P of the first pad part 400-PD, which is described later.

The second signal line part LP2 is connected to the signal line contact part CP through a signal contact hole CH10 formed through the insulating layer 400-IL. The signal line contact part CP connects the first signal line part LP1 and the second signal line part LP2 through the signal contact hole CH10. That is, the first signal line part LP1 is connected to the second signal line part LP2 by the signal line contact part CP. The first sensor line part L1-L1 connects the first touch sensors E1 and the signal pads SL-P of the first pad part 400-PD.

The first pad part 400-PD includes the signal pads SL-P. Each of the signal pads SL-P is connected to corresponding first and second touch sensors E1 and E2 through the first and second sensor line parts L1-L1 and L1-L2 of a first line part L1-L. The first line part L1-L includes a plurality of touch signal lines.

The first pad part 400-PD may further include a first auxiliary pad NS-P. The first auxiliary pad NS-P is electrically connected to the noise shielding layer NSL through a shielding contact hole CH1, illustrated in FIG. 7. A plurality of first auxiliary pads NS-P may be formed. The first pad part 400-PD is electrically insulated from and overlaps the noise shielding layer NSL.

As shown in FIGS. 5, 6A, and 6B, the touch screen panel 400 includes the noise shielding layer NSL, the first touch sensors E1, the second touch sensors E2, the first pad part 400-PD, and the first line part L1-L. In the illustrated embodiment, noise shielding layer NSL and the first touch sensors E1 are formed on the sealing layer 300-CL shown in FIG. 3, which serves as the base layer. However, the base layer should not be limited to the sealing layer 300-CL. The second touch sensors E2 are formed to cross the first touch sensors E1 and are electrically insulated from the first touch sensors E1. The first pad part 400-PD includes the signal pads SL-P and overlaps and is electrically insulated from the noise shielding layer NSL. The first line part L1-L includes the first and second sensor line parts L1-L1 and L1-L2. The first sensor line part L1-L1 connects the first touch sensors E1 and corresponding signal pads SL-P1, SL-P2, and SL-P3. The first sensor line part L1-L1 includes the first signal line part LP1, the second signal line part L2, and the signal line contact part CP. The second sensor line part L1-L2 connects the second touch sensors E2 and corresponding signal pads SL-P4, SL-P5, SL-P6, and SL-P7.

The non-sensing area 400-BR includes the first pad part 400-PD in which the signal pads SL-P are formed and the peripheral area arranged adjacent to the first pad part 400-PD. A second flexible printed circuit board FPC-400 is connected to the first pad part 400-PD. The touch screen panel 400 is connected to the main driving circuit through the second flexible printed circuit board FPC-400.

The first line part L1-L is formed in the peripheral area adjacent to the first pad part 400-PD. A front surface UBS-PP of the upper base member 400-UBS overlaps the sensing area 400-AR and the non-sensing area 400-BR. The upper base member 400-UBS either overlaps the first pad part 400-PD or does not overlap the first pad part 400-PD to avoid overlapping with the second flexible printed circuit board FPC-400.

In the embodiment of FIGS. 5, 6A, and 6B, the touch screen panel 400 can be implemented as a resistive film type or an electromagnetic induction type in addition to the electrostatic capacitive type. Accordingly, the structure of the first and second conductive layers 400-CL1 and 400-CL2 can be changed.

Figure 6C:
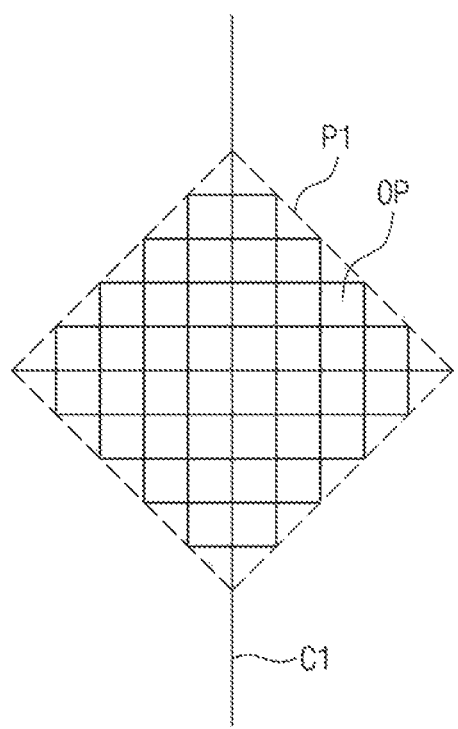
FIG. 6C is a view showing a touch sensing part according to an exemplary embodiment.

FIG. 6C is a view showing the first sensing part P1 and the first connection part C1 according to an exemplary embodiment.

Referring to FIG. 6C, the first touch sensors E1 are formed to have a mesh structure including a plurality of openings OP. Each opening OP corresponds to at least one pixel PX. Each second touch sensor E2 has substantially the same shape as that of the first touch sensors E1. The first and second touch sensors E1 and E2 are formed of a low resistance metal, e.g., silver (Ag), aluminum (Al), copper (Cu), chromium (Cr), nickel (Ni), etc., but they should not be limited thereto or thereby. In some embodiments, since the first touch sensors E1 having the mesh structure are formed by a low temperature process, the pixel PX can be prevented from burning or damaging. In addition, since each pixel PX is arranged to correspond to a corresponding opening among the openings OP, the visibility of the display device DA can be improved.

The shape of the first sensing part P1 should not be limited thereto or thereby. That is, the first sensing part P1 can have a polygonal shape, e.g., a quadrangular shape or a diamond shape, which is formed using a transparent electrode, such as indium tin oxide (ITO).

Figure 7:
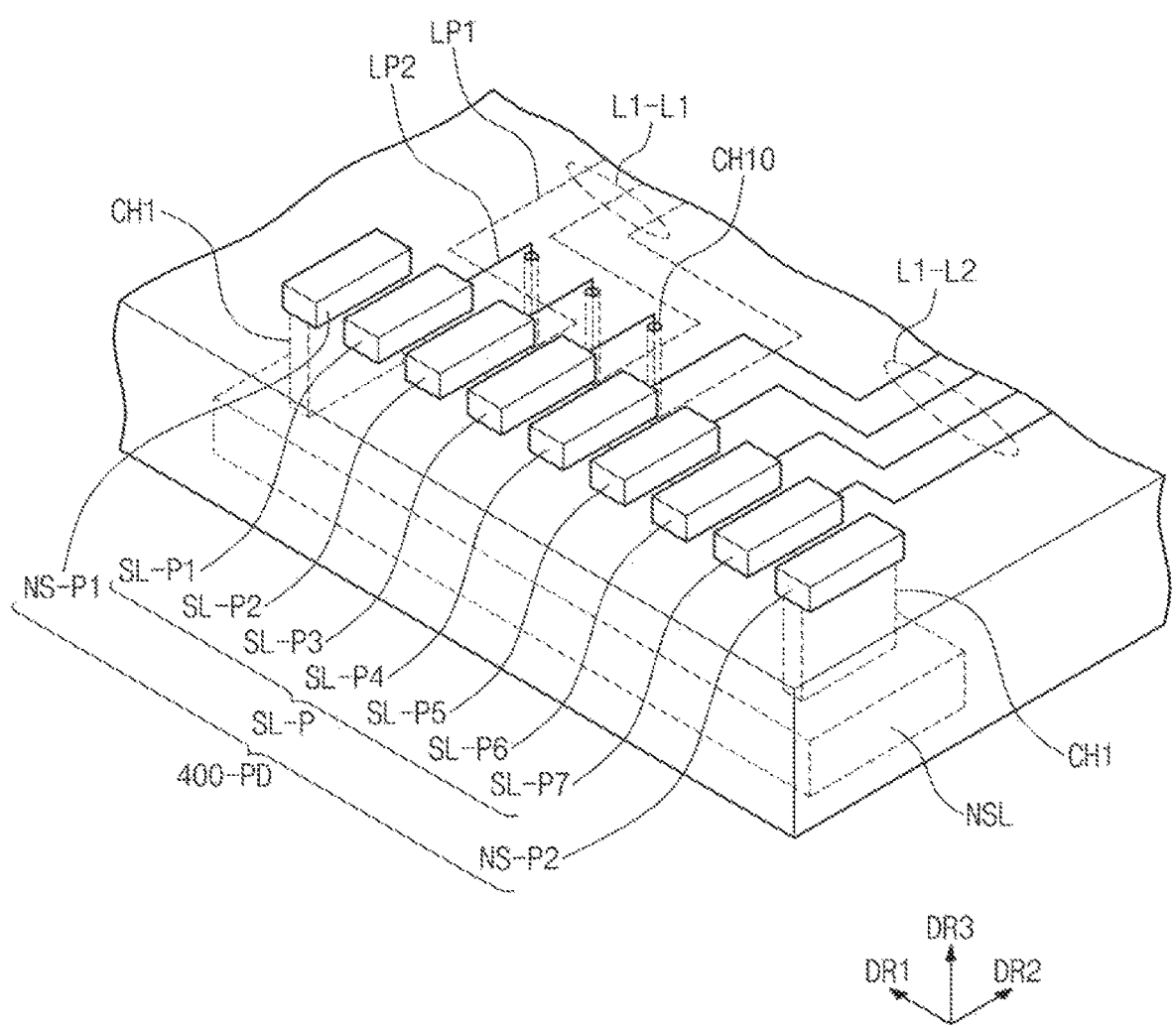
FIG. 7 is a perspective view showing a panel part of a touch screen panel according to an exemplary embodiment.
Figure 8A:
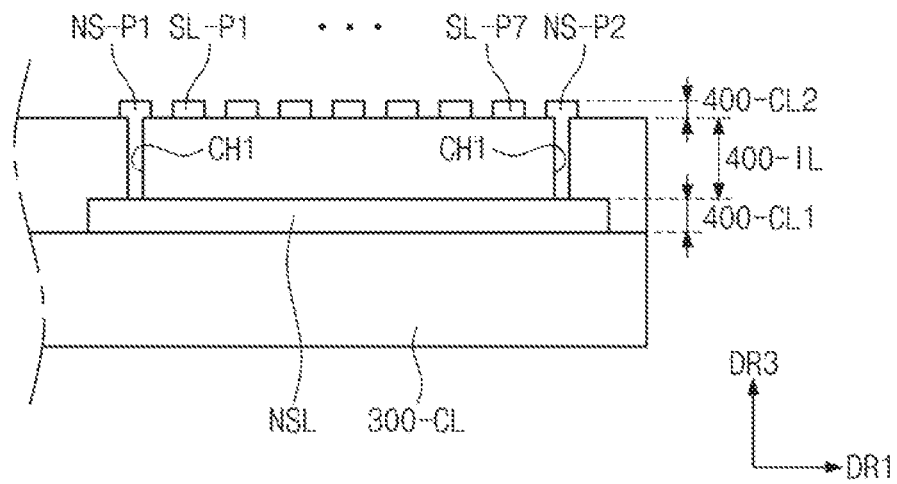
FIGS. 8A to 8C are cross-sectional views showing a pad part of a touch screen panel according to an exemplary embodiment.
Figure 8B:
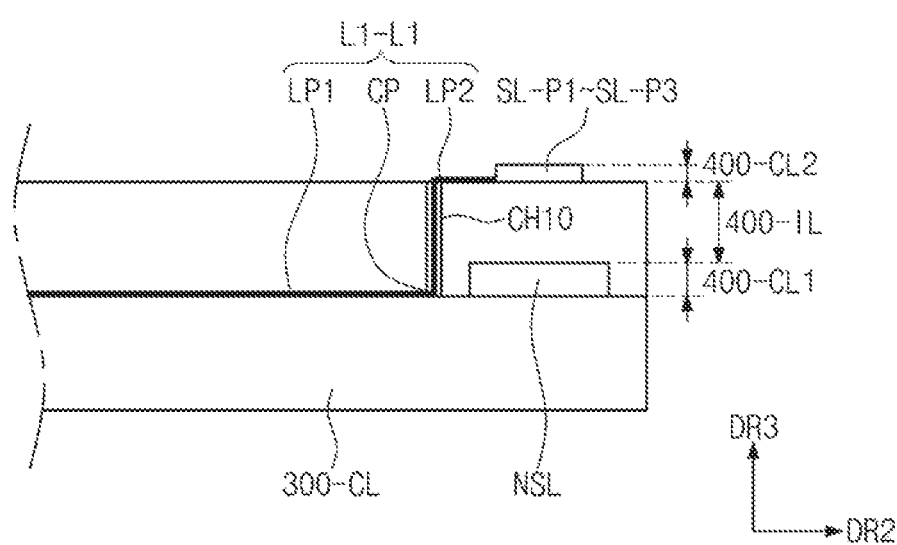
Figure 8C:
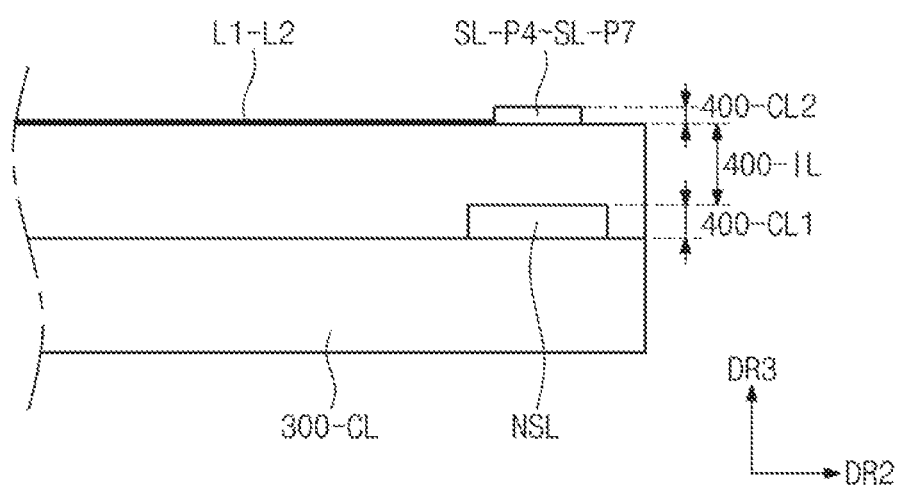

FIGS. 7 and 8A to 8C are views showing the connection relation between the first pad part 400-PD, the noise shielding layer NSL, and the first line part L1-L of the touch screen panel 400. FIG. 8A is a cross-sectional view taken along the first direction DR1 shown in FIG. 7. FIGS. 8B and 8C are cross-sectional views taken along the second direction DR2 shown in FIG. 7.

Referring to FIGS. 7 and 8A to 8C, the first pad part 400-PD includes the signal pads SL-P1, SL-P2, SL-P3, SL-P4, SL-P5, SL-P6, and SL-P7 (hereinafter, referred to as SL-P) and the first auxiliary pad NS-P1 and NS-P2. The number of the signal pads SL-P should not be limited to seven.

As shown in FIGS. 7 and 8A, the first auxiliary pad NS-P1 and NS-P2 is electrically connected to the noise shielding layer NSL through the shielding contact holes CH1 formed in the insulating layer 400-IL. A constant direct current (DC) voltage is applied to first auxiliary pad NS-P1 and NS-P2. In addition, the constant DC voltage can be directly applied to the noise shielding layer NSL without passing through the first auxiliary pad NS-P1 and NS-P2. The voltage applied to the first auxiliary pad NS-P1 and NS-P2 or the noise shielding layer NSL should not be limited to the constant DC voltage.

Referring to FIGS. 7 and 8B, each of the first to third signal pads SL-P1 to SL-P3 is connected to the second signal line part LP2 of the corresponding first sensor line part L1-L1. The second signal line part LP2 is connected to the signal line contact part CP through the signal contact hole CH10 formed in the insulating layer 400-IL. The signal line contact part CP connects the first signal line part LP1 to the second signal line part LP2 through the signal contact hole CH10 formed in the insulating layer 400-IL. The first signal line part LP1 is formed on the first conductive layer 400-CL1 and connected to the first touch sensors E1 as shown in FIG. 6A.

Referring to FIGS. 7 and 8C, each of the fourth to seventh signal pads SL-P4 to SL-P7 is connected to a corresponding second sensor line part L1-L2. Referring to FIG. 6B, the second sensor line part L1-L2 connects the second touch sensors E2 to the signal pads SL-P4, SL-P5, SL-P6, and SL-P7 of the first pad part 400-PD corresponding to the second touch sensors E2.

Referring to FIGS. 2 and 4, a second line part L2-L including the signal lines SGL-2 is formed at a lower portion of the first pad part 400-PD. The second line part L2-L includes a plurality of display signal lines.

The influence of noise on the first pad part 400-PD may be generated in the second line part L2-L, and thus the touch sensitivity of the touch screen panel 400 can be reduced.

The noise shielding layer NSL is interposed between the first pad part 400-PD and the second line part L2-L. The noise shielding layer NSL has an area greater than that of the first pad part 400-PD. Accordingly, the noise shielding layer NSL can prevents the noise, which is generated in the second line part L2-L, from exerting an influence on the first pad part 400-PD. Therefore, the touch sensitivity of the touch screen panel 400 can be improved.

In addition, the second pad part 300-PD including the gate pads GL-P and the data pads DL-P can be arranged at the lower portion of the first pad part 400-PD. The influence of noise on the first pad part 400-PD by the second pad part 300-PD and the operation of the noise shielding layer NSL are substantially the same as those when the second line part L2-L is formed at the lower portion of the first pad part 400-PD.

Figure 9:
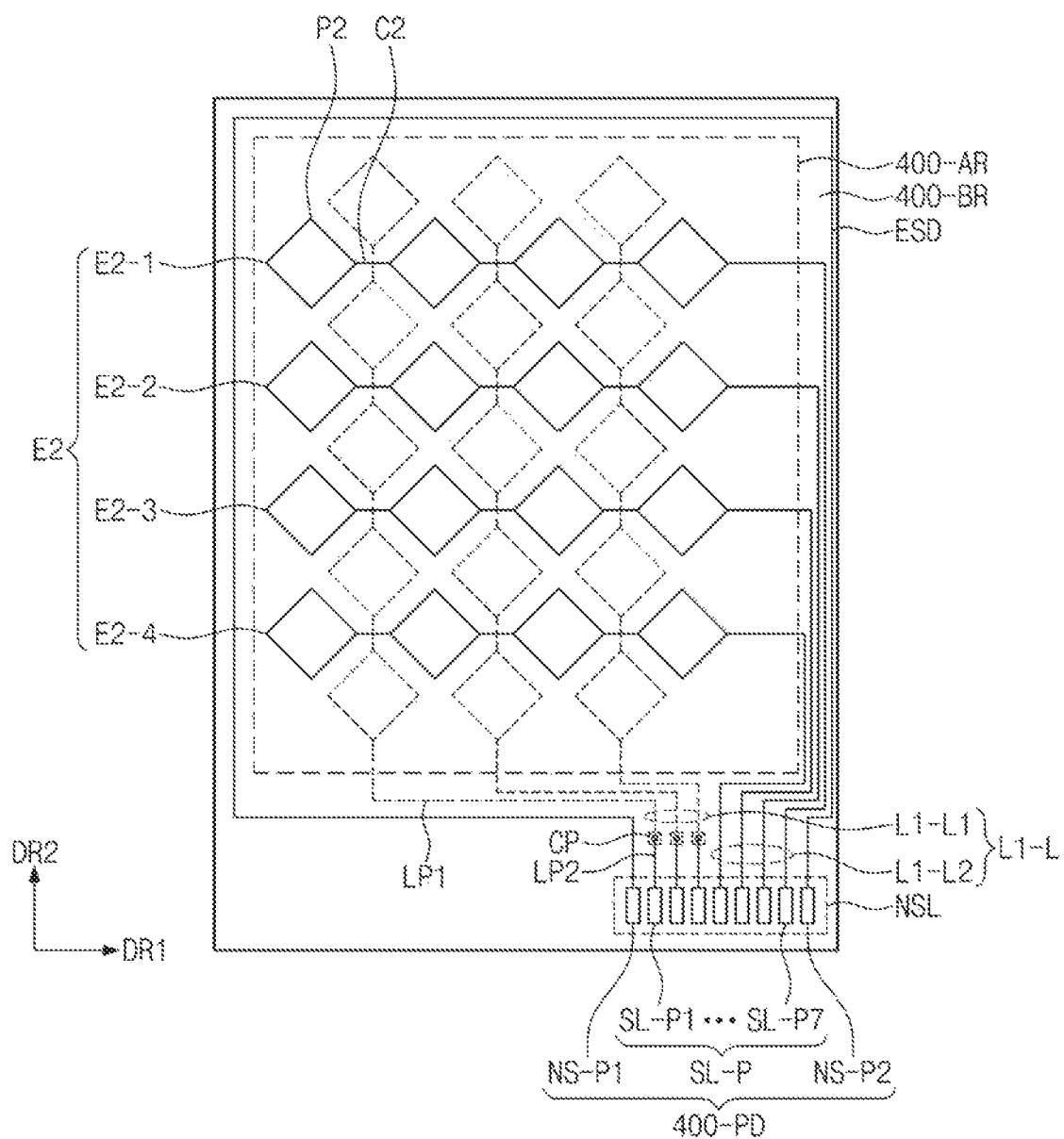
FIGS. 9 and 10 are views showing a touch screen panel according to exemplary embodiments.

FIG. 9 is a view showing the touch screen panel 400 further including an electrostatic discharge line ESD according to an exemplary embodiment.

Referring to FIG. 9, the touch screen panel 400 includes the sensing area 400-AR and the non-sensing area 400-BR surrounding the sensing area 400-AR. The non-sensing area 400-BR includes the electrostatic discharge line ESD applied with a constant DC voltage.

One end of the electrostatic discharge line ESD is connected to one auxiliary pad NS-P1 of a plurality of first auxiliary pads and the other end of the electrostatic discharge line ESD is connected to the other auxiliary pad NS-P2 of the first auxiliary pads. Thus, the noise shielding layer NSL is applied with the constant DC voltage applied to the electrostatic discharge line ESD. When viewed from a different viewpoint, the constant DC voltage applied to the noise shielding layer NSL is applied to the electrostatic discharge line ESD. The voltage applied to the electrostatic discharge line ESD or the noise shielding layer NSL should not be limited to the constant DC voltage.

Figure 10:
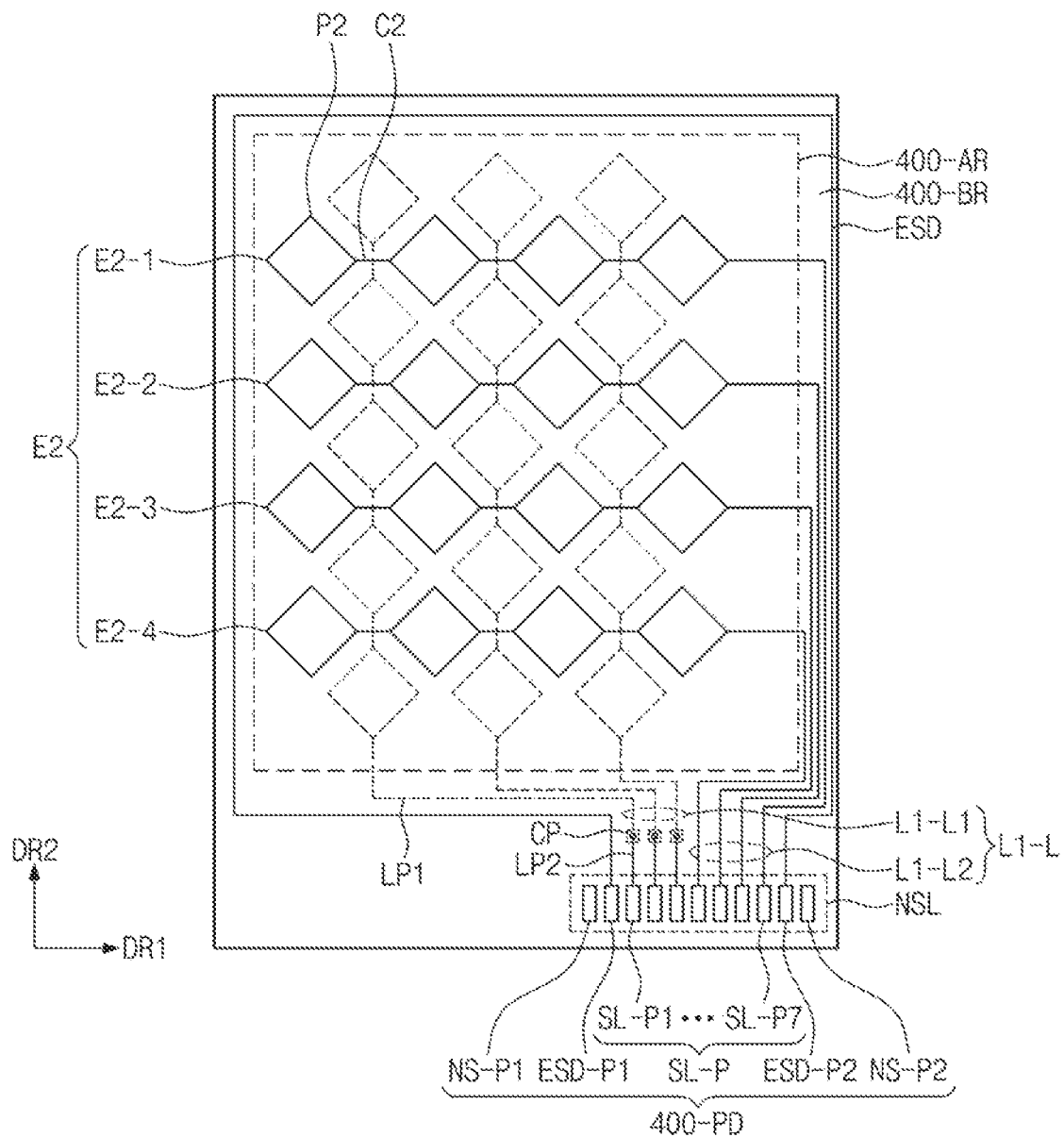

FIG. 10 is a view showing the touch screen panel 400 further including the electrostatic discharge line ESD and second auxiliary pads ESD-P1 and ESD-P2 according to an exemplary embodiment.

Different from the touch screen panel 400 shown in FIG. 9, the touch screen panel 400 further includes the second auxiliary pads ESD-P1 and ESD-P2 to apply the constant DC voltage to the electrostatic discharge line ESD. The second auxiliary pads ESD-P1 and ESD-P2 are arranged in the first pad part 400-PD. The second auxiliary pads ESD-P1 and ESD-P2 can be applied with the same voltage as the first auxiliary pads NS-P1 and NS-P2. In addition, the second auxiliary pads ESD-P1 and ESD-P2 can be applied with a different voltage from the first auxiliary pads NS-P1 and NS-P2.

Various defects, e.g., malfunction, damage, poor process, etc., may occur in the display device DA due to static electricity. Accordingly, when the electrostatic discharge line ESD is arranged at an outermost portion of the display device DA, the static electricity is prevented from entering the display device DA, and thus display quality of the display panel is improved.

Although the exemplary embodiments of the inventive technology have been described, it is understood that the present invention should not be limited to these exemplary embodiments but various changes and modifications can be made by one ordinary skilled in the art within the spirit and scope of the inventive technology as hereinafter claimed.

What is claimed is:

1. A display device comprising:
   a display panel comprising a base substrate, a wire layer, a device layer and a sealing layer; and
   a touch screen panel directly on the sealing layer,
   wherein the touch screen panel comprises:
   a conductive layer over the display panel;
   an insulating layer directly on the conductive layer;
   first touch sensors over the display panel;
   second touch sensors over the display panel and electrically insulated from the first touch sensors; and
   a signal line part comprising a first pad part that is electrically insulated from and overlapping the conductive layer, and touch signal lines that are electrically connected to the first and second touch sensors,
   wherein the conductive layer is interposed between the first pad part and the wire layer of the display panel to shield the first pad part from a noise generated in the wire layer;
   wherein the conductive layer is at the same layer as the first touch sensors; and
   wherein the insulating layer is interposed at least between signal pads of the first pad part and the conductive layer.

2. The display device of claim 1, wherein the insulating layer is further interposed between the first touch sensors and the second touch sensors.

3. The display device of claim 2, wherein the first pad part further comprises at least one first auxiliary pad electrically connected to the conductive layer via a contact hole in the insulating layer.

4. The display device of claim 3, wherein the first auxiliary pad is configured to receive a constant direct current (DC) voltage.

5. The display device of claim 4, wherein each of the first touch sensors comprises:
   i) a plurality of first electrodes arranged in a first direction; and
   ii) a plurality of first connectors each connecting two of the first electrodes, wherein each of the second touch sensors comprises:
   i) a plurality of second electrodes arranged in a second direction crossing the first direction; and
   ii) a plurality of second connectors each connecting two of the second electrodes, and one of the first and second electrodes have a mesh structure.

6. The display device of claim 5, wherein the wire layer comprises:
   a plurality of driving lines electrically connected to the device layer;
   a plurality of display signal lines electrically connected to the driving lines; and
   a second pad part comprising a plurality of pads connected to the display signal lines,
   wherein the conductive layer overlaps the display signal lines.

7. The display device of claim 3, further comprising an electrostatic discharge line configured to receive a constant direct current (DC) voltage, wherein the display panel comprises a sensing area in which the first and second touch sensors are arranged and a non-sensing area in which the electrostatic discharge line is located, wherein the non-sensing area surrounds the sensing area.

8. The display device of claim 1, wherein the first pad part comprises a first pad, a second pad, and an electrostatic discharge line configured to receive a constant direct current (DC) voltage, and wherein one end of the electrostatic discharge line is electrically connected to the first pad, and another end of the electrostatic discharge line is electrically connected to the second pad.

9. A display device comprising:
a display panel comprising a base substrate, a wire layer, a device layer and a sealing layer; and
a touch screen panel directly on the sealing layer,
wherein the touch screen panel comprises:
a conductive layer over the display panel;
first touch sensors over the display panel;
second touch sensors over the display panel and electrically insulated from the first touch sensors; and
a signal line part comprising a first pad part that is electrically insulated from and overlapping the conductive layer, and touch signal lines that are electrically connected to the first and second touch sensors,
wherein the conductive layer is interposed between the first pad part and the wire layer of the display panel to shield the first pad part from a noise generated in the wire layer;
wherein the conductive layer is at the same layer as the first touch sensors;
wherein the touch screen panel further comprises an insulating layer interposed: i) between the first touch sensors and the second touch sensors; and ii) between the conductive layer and signal pads;
wherein the first pad part further comprises at least one first auxiliary pad electrically connected to the conductive layer via a contact hole in the insulating layer;
wherein the display device further comprises an electrostatic discharge line configured to receive a constant direct current (DC) voltage, wherein the display panel comprises a sensing area in which the first and second touch sensors are arranged and a non-sensing area in which the electrostatic discharge line is located, wherein the non-sensing area surrounds the sensing area; and
wherein the at least one first auxiliary pad comprises a plurality of first auxiliary pads, wherein one end of the electrostatic discharge line is electrically connected to one of the first auxiliary pads, and wherein another end of the electrostatic discharge line is electrically connected to another of the first auxiliary pads.

10. A display device comprising:
a display panel comprising a base substrate, a wire layer, a device layer and a sealing layer; and
a touch screen panel directly on the sealing layer,
wherein the touch screen panel comprises:
a conductive layer over the display panel;
first touch sensors over the display panel;
second touch sensors over the display panel and electrically insulated from the first touch sensors; and
a signal line part comprising a first pad part that is electrically insulated from and overlapping the conductive layer, and touch signal lines that are electrically connected to the first and second touch sensors,
wherein the conductive layer is interposed between the first pad part and the wire layer of the display panel to shield the first pad part from a noise generated in the wire layer;
wherein the conductive layer is at the same layer as the first touch sensors;
wherein the touch screen panel further comprises an insulating layer interposed: i) between the first touch sensors and the second touch sensors; and ii) between the conductive layer and signal pads;
wherein the first pad part further comprises at least one first auxiliary pad electrically connected to the conductive layer via a contact hole in the insulating layer;
wherein the display device further comprises an electrostatic discharge line configured to receive a constant direct current (DC) voltage, wherein the display panel comprises a sensing area in which the first and second touch sensors are arranged and a non-sensing area in which the electrostatic discharge line is located, wherein the non-sensing area surrounds the sensing area; and
wherein the first pad part further comprises a plurality of second auxiliary pads configured to apply the DC voltage to the electrostatic discharge line, wherein one end of the electrostatic discharge line is electrically connected to one of the second auxiliary pads, and wherein another end of the electrostatic discharge line is electrically connected to another of the second auxiliary pads.

* * * * *